(12) United States Patent
Arora et al.

(10) Patent No.: US 10,616,220 B2
(45) Date of Patent: Apr. 7, 2020

(54) AUTOMATIC ONBOARDING OF END DEVICES USING DEVICE PROFILES

(71) Applicant: Hewlett Packard Enterprise Development LP, Houston, TX (US)

(72) Inventors: Praveen Kumar Arora, Bangalore (IN); Sivasankaran Nagarajan, Bangalore (IN); Nitin Singla, Bangalore Karnataka (IN); Yashavantha Nagaraju, Bangalore Karnataka (IN); Praveen Ganjam Ramesh, Bangalore Karnataka (IN); Kunal Deshpande, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 15/926,257

(22) Filed: Mar. 20, 2018

(65) Prior Publication Data
US 2019/0238539 A1  Aug. 1, 2019

(30) Foreign Application Priority Data
Jan. 30, 2018  (IN) .............................. 201841003528

(51) Int. Cl.
   *H04L 29/06*  (2006.01)
(52) U.S. Cl.
   CPC ........ *H04L 63/0876* (2013.01); *H04L 63/104* (2013.01); *H04L 63/162* (2013.01); *H04L 63/20* (2013.01)
(58) Field of Classification Search
   CPC ... H04L 63/0876; H04L 63/20; H04L 63/162; H04L 63/104

USPC .......................................................... 726/29
See application file for complete search history.

(56) References Cited

U.S. PATENT DOCUMENTS

| | | | |
|---|---|---|---|
| 7,380,025 B1* | 5/2008 | Riggins | H04L 41/0809 710/10 |
| 8,046,450 B1* | 10/2011 | Schloss | H04L 41/0809 709/223 |
| 8,108,673 B2 | 1/2012 | Frazier et al. | |
| 8,504,690 B2* | 8/2013 | Shah | H04L 12/12 709/226 |
| 9,130,837 B2 | 9/2015 | Biarnason et al. | |
| 9,600,302 B2 | 3/2017 | Watsen | |
| 2013/0189953 A1* | 7/2013 | Mathews | H04W 12/06 455/411 |
| 2013/0190018 A1* | 7/2013 | Mathews | H04W 4/023 455/456.6 |

(Continued)

OTHER PUBLICATIONS

Cisco, Zero Touch Provisioning IOS, (Web Page), BRKCDN-2010, Retrieved Mar. 14, 2018, 55 Pgs.

(Continued)

*Primary Examiner* — Teshome Hailu
(74) *Attorney, Agent, or Firm* — Sheppard Mullin Richter & Hampton (57) ABSTRACT

A method, executable by a switch to automatically onboard end devices connected thereto, comprises detecting that an end device has connected to the switch, and determining a device identity of the connected end device. The determined device identity is used to obtain a configuration template profile associated with the connected end device. The switch is configured using the obtained configuration template profile.

16 Claims, 7 Drawing Sheets

(56) References Cited

U.S. PATENT DOCUMENTS

| | | | | |
|---|---|---|---|---|
| 2014/0068030 | A1* | 3/2014 | Chambers | H04L 41/0809 709/220 |
| 2014/0359127 | A1 | 12/2014 | Linares et al. | |
| 2016/0308865 | A1* | 10/2016 | Poli | H04W 4/021 |
| 2017/0026234 | A1 | 1/2017 | Dhulipala et al. | |
| 2017/0099187 | A1 | 4/2017 | Dale et al. | |

OTHER PUBLICATIONS

Juniper Networks, Networking Update, (Web Page), Aug. 2017, 41 Pgs.

Managing Auto Assignment Policies, (Web Page), Dec. 8, 2016, 2 Pgs.

Wikipedia: "Link Layer Discovery Protocol", Nov. 1, 2017 (Nov. 1, 2017), XP055539371, Retrieved from the Internet: URL:https://en.wikipedia.org/w/index.php?title= Link_Layer_Discovery_Protocol &oldid=8 08179148 [retrieved on Jan. 8, 2019].

European Search Report and Search Opinion Received for EP Application No. 18191612.3, dated Jan. 17, 2019, 9 pages.

"Understanding AP Configuration Profiles", available online at <https://web.archive.org/web/20180221094709/https://www.arubanetworks.com/techdocs/ArubaOS_63_Web_Help/Content/ArubaFrameStyles/AP_Config/AP_Configuration_Profile.htm>, Feb. 21, 2018, 6 pages.

"IEEE Standard for Local and metropolitan area networks—Station and Media Access Control Connectivity Discovery; IEEE Std 802.1AB-2016 (Revision of IEEE Std 802.1AB-2009)", IEEE Standard, IEEE, Piscataway, NJ, USA, Mar. 11, 2016 (Mar. 11, 2016), pp. 1-146, XP068106473, ISBN: 978-1-5044-0632-1.

"HPE ArubaOS—Switch Management and Configuration Guide for YA/YB.16.02", Part No. 5200-1670b, Edition: 3, Nov. 2016, 449 pages.

"Auto configuration upon Aruba AP detection", available online at <http://h22208.www2.hpe.com/eginfolib/networking/docs/switches/RA/16 01/webhelp/content/ch10.html>, 2016, 4 pages.

"ArubaOS Switch MAS Feature Integration Reference Guide", available online at <https://support.hpe.com/hpsc/doc/public/display?sp4ts.oid=5171624&docLocale=en_US&docId=emr_nac05112671>, May 2016, 25 pages.

* cited by examiner

AUTOMATIC ONBOARDING OF END DEVICES USING DEVICE PROFILES

BACKGROUND

Enterprises have a variety of users and end devices or endpoints, which results in multiple use cases that need to be addressed by the policy infrastructure of such enterprises. For example, depending on the type of end device and how it is being used, different types of device profiles and configurations are needed for each device. A policy infrastructure should enable any end device to be connected to any port on an access switch. Network switches can be configured with different device profiles that constitute attributes to be configured on switch ports, such as a. Virtual Local Area Network, VLAN, Class of Service (CoS), Power over Ethernet (PoE) priority, and so on. Switches shall also be configured with default device profiles for different device types.

BRIEF DESCRIPTION OF THE DRAWINGS

In the accompanying drawings, like numerals refer to like components or blocks. The following detailed description references the drawings, wherein.

DETAILED DESCRIPTION

The following detailed description refers to the accompanied figures. Wherever possible, the same reference numbers are used in the figures and the following description to refer to the same or similar parts. It is to be expressly understood, however, that the figures are for the purpose of illustration and description only. While several examples are described throughout, modification, adaptions, and other implementations are possible. Accordingly, the following detailed description is not meant to limit the disclosed examples, rather it is meant to provide proper scope of the disclosed examples and may be defined by the appended claims.

Examples described in this disclosure are concerned with automatically onboarding an end device using device profiles, for example by automatically configuring a switch, for example an access switch, using a configuration template profile. The examples enable a switch to be configured in a Zero Touch Provisioning (ZTP) environment when automatically onboarding an end device, as will be described in greater detail below.

Figure 1:
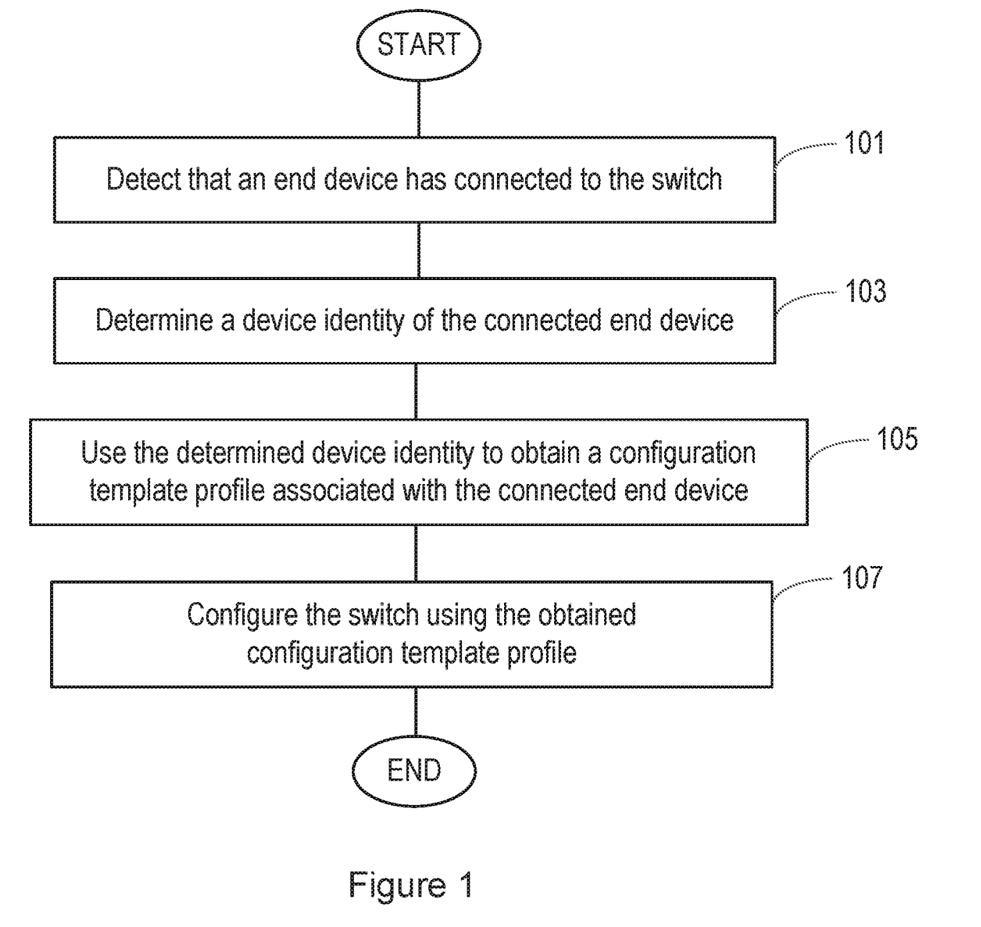
FIG. 1 is a flow diagram of an example method described herein.

FIG. 1 shows an example of a method executable by a switch to automatically onboard end devices connected thereto. The switch may comprise, for example, an access switch.

The method comprises detecting that an end device has connected to the switch, block 101. The method comprises determining a device identity of the connected end device, block 103. The method comprises using the determined device identity to obtain a configuration template profile associated with the connected end device, block 105. The switch is configured using the obtained configuration template profile, block 107. In examples described herein the detecting, determining, using and configuring are performed using zero touch provisioning, ZTP.

In some examples the device fingerprint comprises a media access control, MAC, address of the connected end device, and/or other MAC layer 2 information relating to the connected end device, or relates to dynamic host configuration protocol, DHCP, options or http user-agent strings. Such a device fingerprint may be acquired, for example, using a link layer discovery protocol, LLDP. For example, the device fingerprint may be acquired from type-length-value, TLV, structures of LLDP.

Upon acquiring this device fingerprint, in one example the switch sends this device fingerprint to a fingerprint engine. A fingerprint engine may comprise, for example, a network node, database, plug-in function, cloud entity, a network policy manager server, a policy management platform, or an authentication server, which stores a depository of device identities (Device_IDs). Using the received device fingerprint, such as the MAC address, the fingerprint engine is then able to determine the device identity of the end device which has connected to the switch, and return this to the switch.

In some examples the fingerprint engine comprises a clear pass policy manager, CPPM. The clear pass policy manager CPPM is a policy management platform that provides role-based and device-based network access control (NAC) for any user across any wired, wireless, and VPN infrastructure. Enterprises with wireless infrastructure may deploy CPPM to provide NAC services for the wireless infrastructure, to help enterprises to deploy consistent security policies across their wired and wireless infrastructure.

The CPPM may comprise a clear pass profile engine that performs device profiling. Once enabled, the clear pass profile engine can automatically collect a variety of data about end devices, analyze the data to classify the end devices, and store the classifications as device profiles in an end device repository. The device profiles may then be used in enforcement policies to control access to a network. For example, an enforcement policy may be created that grants end devices profiled as VoIP phones access to specific servers in a network. In another example, an enforcement policy may be created that places all end devices profiled as access points in a specific VLAN.

In some examples the determining of the device identity of the connected end device, as described in FIG. 1, comprises acquiring a device fingerprint relating to the connected end device, and sending the acquired device fingerprint to a fingerprint engine, and receiving a device identity associated with the device fingerprint from the fingerprint engine.

The switch, having determined the device identity of the end device connected thereto, can then obtain an associated configuration template profile for that particular end device, i.e. based on the determined device identity. In one example this comprises fetching the configuration template profile from another network node, or cloud entity, which stores a depository of template profiles for different types of end devices. For example, the switch may send the device identity, Device_ID, of the connected end device to a network management server, NMS, which stores such configuration template profiles. Upon receiving the device identity from the switch, the NMS searches for a configuration template profile corresponding to such a device identity, and if a match is found, returns the relevant configuration template profile to the switch.

Thus, in one example, using the determined device identity to obtain a configuration template profile associated with the connected end device comprises sending the determined device identity to a network management server, NMS, and receiving an associated configuration template profile from the NMS.

The received configuration template profile can then be used to automatically configure the switch.

If the switch has previously had a similar end device connect thereto at a previous occasion, the switch may have stored a device identity for such a type of end device. Therefore, in some examples, the switch can first check whether a device identity, Device_ID, is already stored locally, relating to the device fingerprint that has been acquired from the connected end device. If so, the switch can send this directly to the NMS for fetching the configuration template profile, without first having to consult a fingerprint engine or the like. This can save network resources and traffic.

Thus, in some examples, the process of determining the device identity of the connected end device comprises acquiring device fingerprint relating to the connected end device, by checking if the device fingerprint already has a corresponding device identity stored locally at the switch and, if so, using the locally stored device identity to obtain the configuration template profile.

Therefore, as mentioned above, if the switch has already had a similar end device connected thereto before, and therefore already has a device identify stored locally, this avoids the switch having to consult the fingerprint engine (e.g. CPPM) in order to ascertain the device identity.

In a similar manner to above, if the switch has previously had a similar end device connect thereto at a previous occasion, the switch may have stored a device identity and a configuration template profile for such a type of end device. Therefore, in some examples, the switch can first check whether a device identity and corresponding configuration template profile is already stored locally, relating to the device fingerprint that has been acquired from the connected end device. If so, the switch can use this locally stored configuration template profile to automatically configure itself. Again, this can save network resources and traffic.

Thus, in some examples, the process of using the determined device identity to obtain a configuration template profile associated with the connected end device comprises retrieving a locally stored configuration template profile associated with the device identity, wherein the locally stored configuration profile was obtained during a previous connection of a similar end device.

Such an example avoids the switch having to consult a fingerprint engine (e.g. CPPM) and the NMS, which reduces network time significantly in order to try and onboard an end device of a previously similar end device, because of the ZTP environment.

In some examples, if the determined device identity does not comprise an associated configuration template profile, for example when a search is performed on the NMS, a default configuration template profile may be used to configure the switch. Therefore, if the NMS does not happen to have a template for the particular end device, then a default template is used. Also, if the NMS is not reachable, a locally stored default configuration template can be used in such a circumstance.

In the examples described herein, it is noted that a configuration template profile for an end device may comprise any form of configuration profile relating to the switch, including for example at least one of the following profiles: untagged-vlan profiles; tagged-vlan profiles; ingress-bandwidth profiles; egress-bandwidth profiles, Class of Service (CoS) profiles, Power over Ethernet (PoE) profiles; and other profiles.

Furthermore, in the examples described herein, and end device may comprise any form of device, including for example a computer, laptop, camera, smartphone, printer, etc., or any other form of device that wishes to connect to an enterprise via a switch.

It is noted that examples described herein provide a workflow for layer 2 device authorization, onboarding and provisioning using MAC address augmented with device type information gathered, e.g. using LLDP, at a network device (e.g., switch, controller, access point, AP, products).

Figure 2:
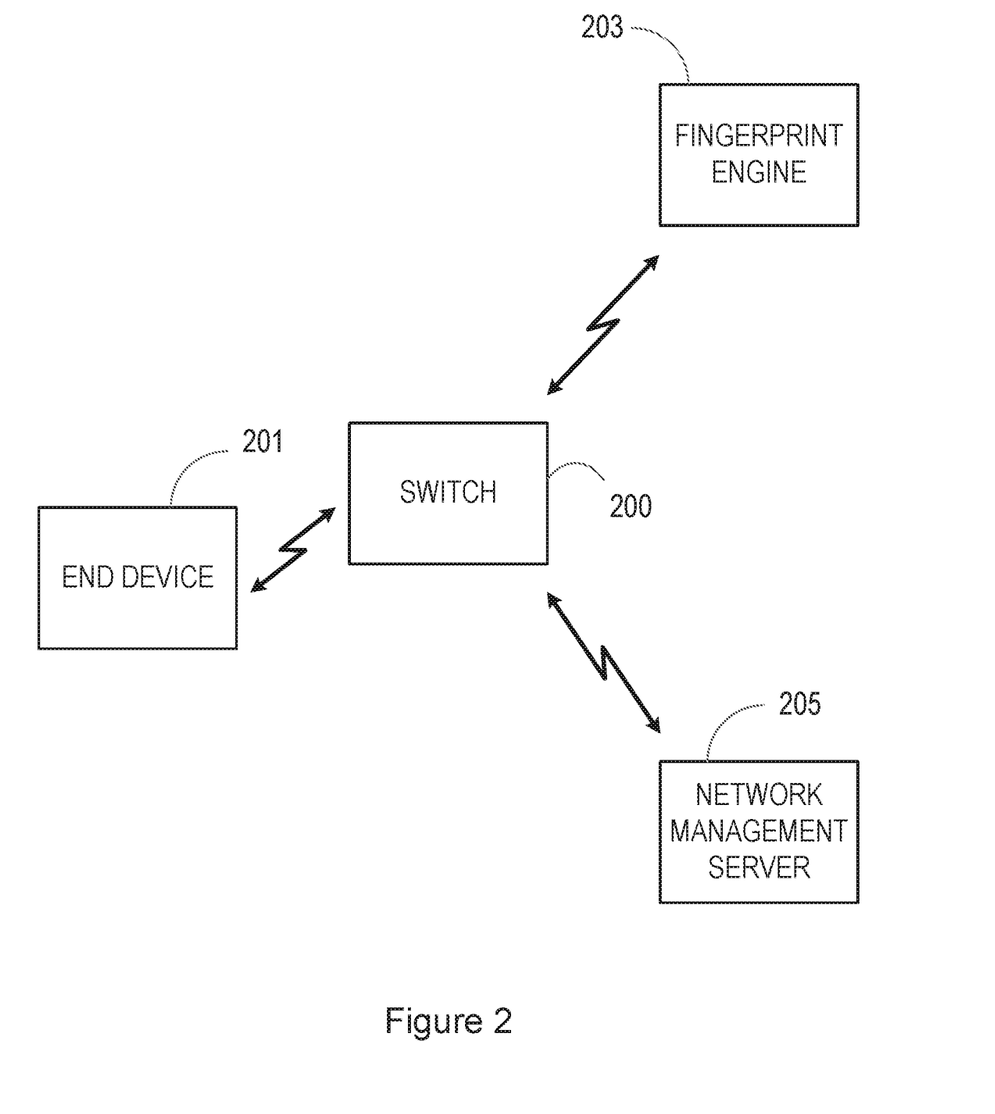
FIG. 2 is an example of a system.

FIG. 2 shows a system according to an example, comprising a switch 200, to which an end device 201 can be connected or onboarded as described above. Upon detecting the connection of an end device 201, the switch 200 automatically interfaces with a fingerprint engine 203 and/or network management server 205 as described in the examples above, to configure the switch 200 using a configuration template profile relating to the end device 201 which has connected thereto, thereby automatically onboarding the connected end device.

In one example, a system comprises a switch 200, an end device 201, a fingerprint engine 203 and a network management server, NMS 205. In response to the end device 201 connecting to the switch 200, the switch 200 determines a device identity of the connected end device 201, in conjunction with the fingerprint engine 203, using a media access control, MAC, address of the connected end device 201, and fetches a configuration template profile relating to device identity from the NMS 205, to automatically configure the switch for operation with the connected end device 201.

Figure 3:
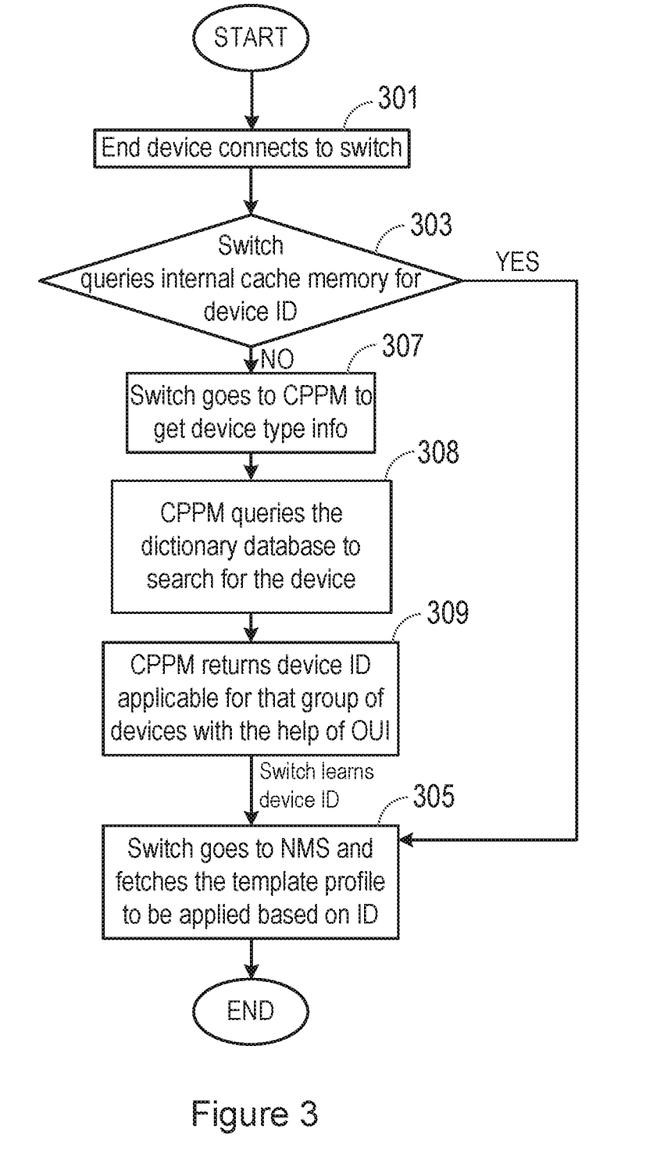
FIG. 3 is a flow diagram of an example method described herein.

FIG. 3 shows a method according to another example, in which various interactions as described in the examples above are explained further. In response to detecting that an end device has connected to the switch, block 301, the method comprises determining whether the switch already has a device identity, Device_ID, associated with device fingerprint gathered from the connected end device, block 303. As mentioned above, this may involve determining a MAC address or other MAC layer 2 information, e.g. using LLDP. If the switch already has a Device_ID relating to the type of end device, according to this example the method comprises sending this Device_ID to a network management server, NMS, and fetching a configuration template profile to be applied to the switch, i.e. based on the Device_ID of the connected end device, block 305.

In such an example the switch can be configured according to the received or fetched configuration template profile, without necessarily requiring access to a fingerprint engine or some other function, such as a CPPM, for determining the device identity of the end device.

In another example (not shown), in block 303, as well as determining whether the switch already has a stored Device_ID for the connected end device, the switch determines whether it already has a stored configuration template profile for that particular Device_ID, for example because a similar end device has previously connected to the switch, and the switch has therefore previously fetched or received an associated configuration template profile for that Device_ID. In such an example, the switch can be configured according to the already stored configuration template profile, without necessarily requiring access to a policy manager server, such as a CPPM, nor a network management server, NMS.

If in block 303 it is determined that the switch has not already stored a Device_ID for the connected end device, then in block 307 the method comprises acquiring the Device_ID for the connected end device. For example, this may comprise sending the device fingerprint in block 307 to a fingerprint engine, such as a CPPM.

In block 308, the fingerprint engine, e.g. CPPM, determines a Device_ID from the received device fingerprint, for example by querying a dictionary database to search for the device.

The fingerprint engine returns a Device_ID to the switch, e.g. one applicable to that group of devices, block 309, for example with the help of an organizational unique identifier, OUI, as will be described later.

Therefore, in block 309, upon receiving the Device_ID from the fingerprint engine, the switch forwards the device identity to a NMS to fetch the configuration profile template to be applied, based on the Device_ID, block 305.

If in block 305 the NMS cannot find a configuration template profile relating to the specific Device_ID, the NMS returns a default configuration template profile to the switch, such that the switch can then apply the default configuration template profile to configure itself, and automatically onboard the end device.

Figure 4:
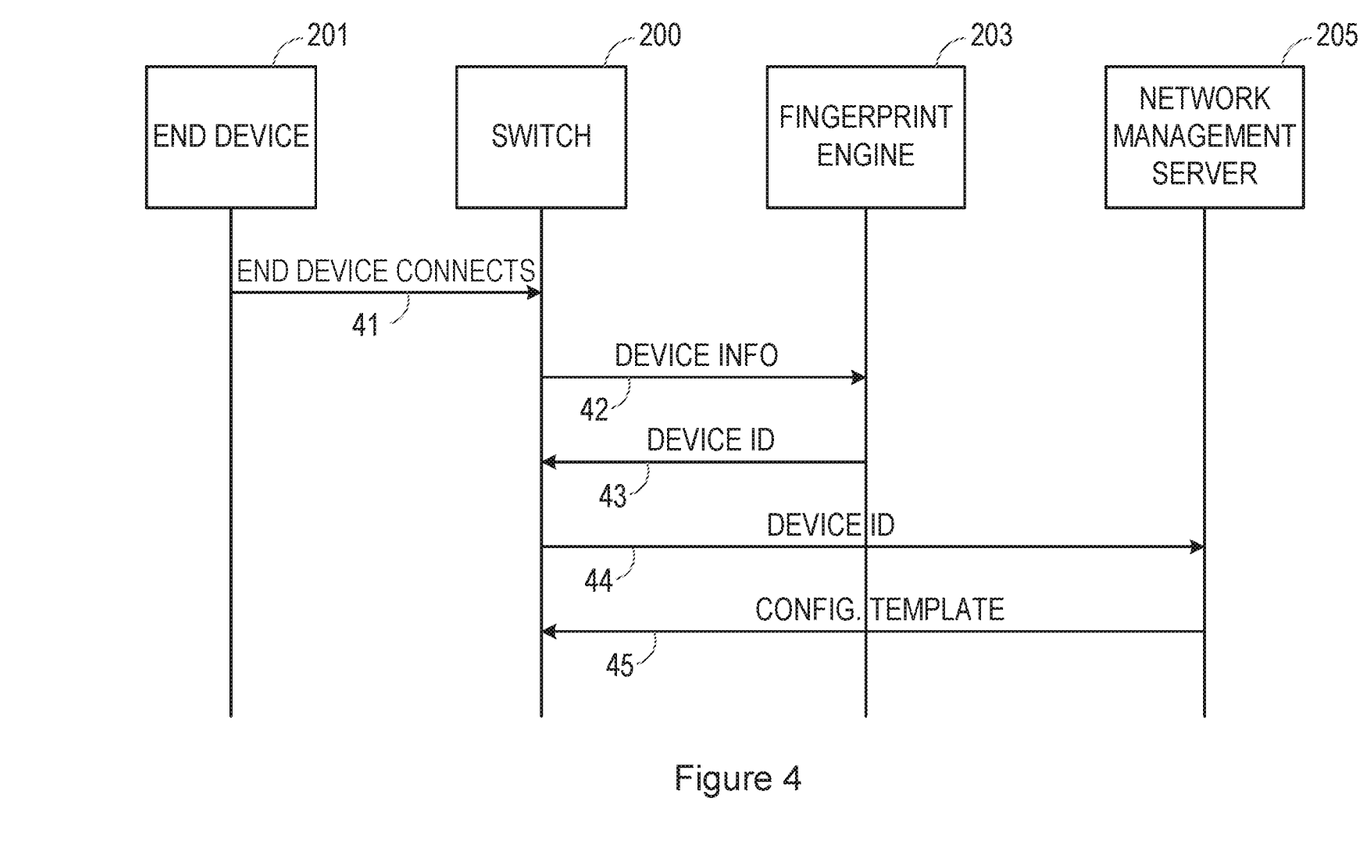
FIG. 4 is an example of a signaling diagram.

FIG. 4 shows an example of a signaling diagram between a switch 200, an end device 201, a fingerprint module 203 and a network management server 205.

Upon detecting an end device 201 connected thereto (41), the switch 200 sends the device fingerprint (42) to a fingerprint engine 203. The fingerprint engine 203 returns a device identity, Device_ID (43), to the switch 200. The switch 200 sends the device identity, Device_ID (44), to the networking management server 205, which returns a configuration template profile (45) to the switch 200. The switch 200 is then configured using the received configuration template profile.

Figure 5:
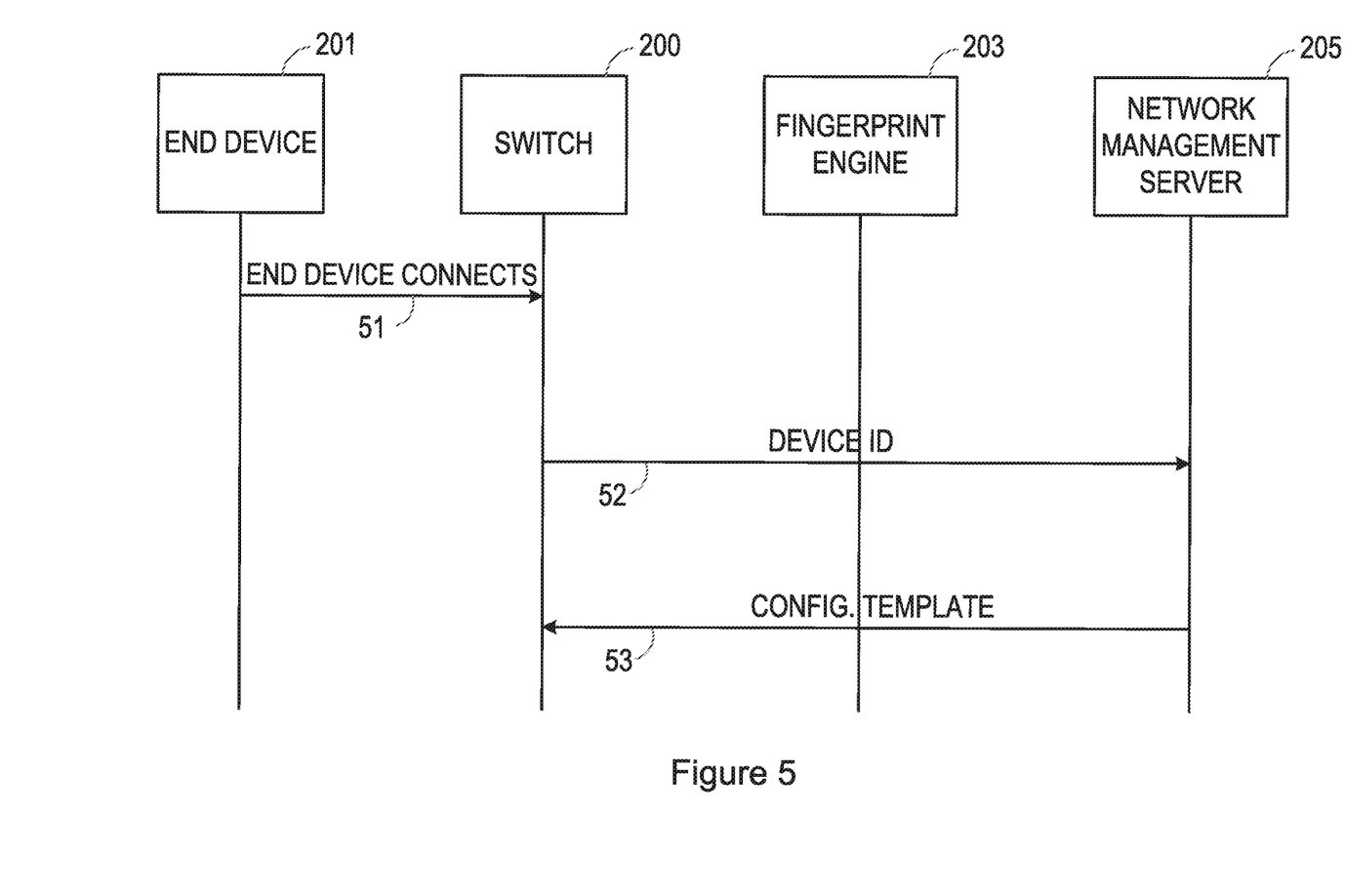
FIG. 5 is an example of a signaling diagram.

FIG. 5 shows an example of a signaling diagram between a switch 200, an end device 201, a fingerprint module 203 and a network management server 205, for example whereby a similar end device 201 has previously connected to the switch 200.

According to this example, upon detecting an end device 201 connected thereto (51), the switch 200 sends the device identity, Device_ID (52) of the connected end device 201 to the 30 networking management server 205, based on a Device_ID that is already locally stored at the switch 200. As such, since the switch 200 already has the Device_ID of the end device 201 stored locally, there is no need to consult the fingerprint engine 203. The network management server 205 returns a configuration template profile (53) to the switch 200. The switch 200 is then configured using the received configuration template profile.

Figure 6:
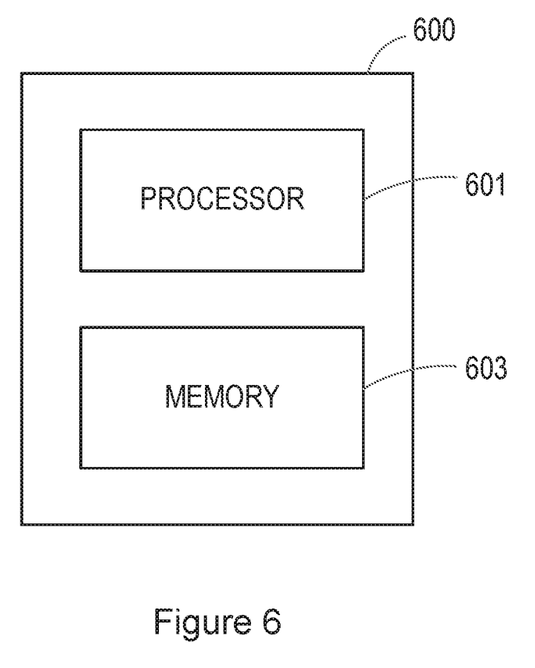
FIG. 6 is a block diagram of an example network switching device with a processing resource to execute instructions in a machine-readable storage medium.

FIG. 6 is a block diagram of network switching device 600 with processing resource 601 to execute instructions within a machine-readable storage medium 603. Although the network switching device 600 includes processing resource 601 and machine-readable storage medium 603, it may also include other components, e.g. other interfaces for communicating with other network resources and nodes. For example, the network switching device 600 may include a controller, memory storage, or other suitable types of component. The network switching device 600 is an electronic device with the processing resource 601 capable of executing instructions, and as such examples of the network switching device 600 include a switch, server, router, wireless access point (WAP), computing device, or other type of electronic device capable of executing instructions. The instructions may be implemented as methods, functions, operations, and other processes implemented as machine-readable instructions stored on the storage medium 603, which may be non-transitory, such as hardware storage devices (e.g., random access memory (RAM), read only memory (ROM), erasable programmable ROM, electrically erasable ROM (EEPROM), hard drives, and flash memory).

In one example the processing resource 601 executes instructions stored in the machine-readable storage medium 603 to cause the network switching device to detect that an end device has connected to the network switching device; determine a device identity of the connected end device; use the determined device identity to obtain a configuration template profile associated with the connected end device; and configure the network switching device using the obtained configuration template profile.

The machine-readable storage medium 603 may also include instructions for the processing resource 601 to cause the network switching device to perform the methods described in the examples herein.

For example, the instructions executable by the processor cause the network switching device to determine the device identity of the connected end device by: acquiring a device fingerprint relating to the connected end device; sending the acquired device fingerprint to a fingerprint engine; and receiving a device identity associated with the device fingerprint from the fingerprint engine; and using the determined device identity to obtain a configuration template profile associated with the connected end device by: sending the determined device identity to a network management server, NMS; and receiving an associated configuration template profile from the NMS.

According to another example, there is provided a non-transitory machine-readable storage medium comprising instructions that when executed by a processing resource cause a network switching device to: detect that an end device has connected to the network switching device; determine a device identity of the connected end device; use the determined device identity to obtain a configuration template profile associated with the connected end device; and configure the network switching device using the obtained configuration template profile.

The non-transitory machine-readable storage medium may comprise instructions that when executed by a processing resource cause a network switching device to operate as described in any of the examples described herein.

From the examples described above it can be seen that an appropriate device configuration may be downloaded from an NMS with the help of a fingerprint engine, e.g. a clear pass policy manager (CPPM) in a complete ZTP environment. The auto device detection and configuration detects a directly connected end device dynamically, for example an access point, and applies predefined configurations to the switch, for example to ports on which the access point is detected. If any other device connects to the switch, the CPPM reverts with the Device_ID of the newly connected end device. The switch on getting the Device_ID can fetch the appropriate template for that end device, by downloading in a complete ZTP environment.

It is noted that a network management server, NMS, can provide a simple, secure and cost-effective way to manage and monitor network switches and applications. A network management server of examples described herein may also offer other advanced capabilities, such as customizable guest Wi-Fi, troubleshooting procedures to enable connectivity issues to be foreseen (for example using live user monitoring or synthetic testing), and presence analytics for smarter decision making.

A network management server according to examples described herein may also allow a user to apply configuration commands from a command-line (CLI) snippet to switches provisioned under a template group. CLI snippets can also be used to override the variable definitions for each device in the template group. The templates may be created manually and stored in the NMS, and then pushed as per the particular application, e.g. as described in the examples above. For devices mapped to a template group, a template can be created with a standard set of CLI scripts, configuration commands, and variables. If a group is set a template group, the configuration wizards for the devices in that group are disabled. Both templates and template groups are created manually and then pushed from NMS. Also, there may be a provision to configure a device identity manually and attach that identity to a specific profile. For example: "device-identity name "cpe" lldp oui 33bbcc" and "device-identity name "cpe" lldp sub-type 1". This associates a device identity with the device profile manually. In some examples an organizationally unique identifier, OUI and subtype is configured manually using CLI/SNMP, which is associated with a device identity, e.g. using:

(Config) # device-identity name <device name> lldp oui <OUT> subtype <subtype>

The device identity, Device_TD, can be enabled or disabled, for example, using discovery protocol. This device identification can be used in other subsystems such as device profile.

To illustrate this:
show device-identity help
Usage: show device-identity lldp.
Description: Show device identity configuration.
Device Identity Configuration

| Index | Device Name | OUI | Subtype |
|-------|-------------|--------|---------|
| 1 | cpe | 33bbcc | 0 |
| 2 | phone | 112233 | 2 |
| 3 | camera | 000000 | 0 |

It is noted that the table above is merely an example of how a Device_ID is linked to a particular configuration template, and that other forms of associating or mapping may be used.

Figure 7:
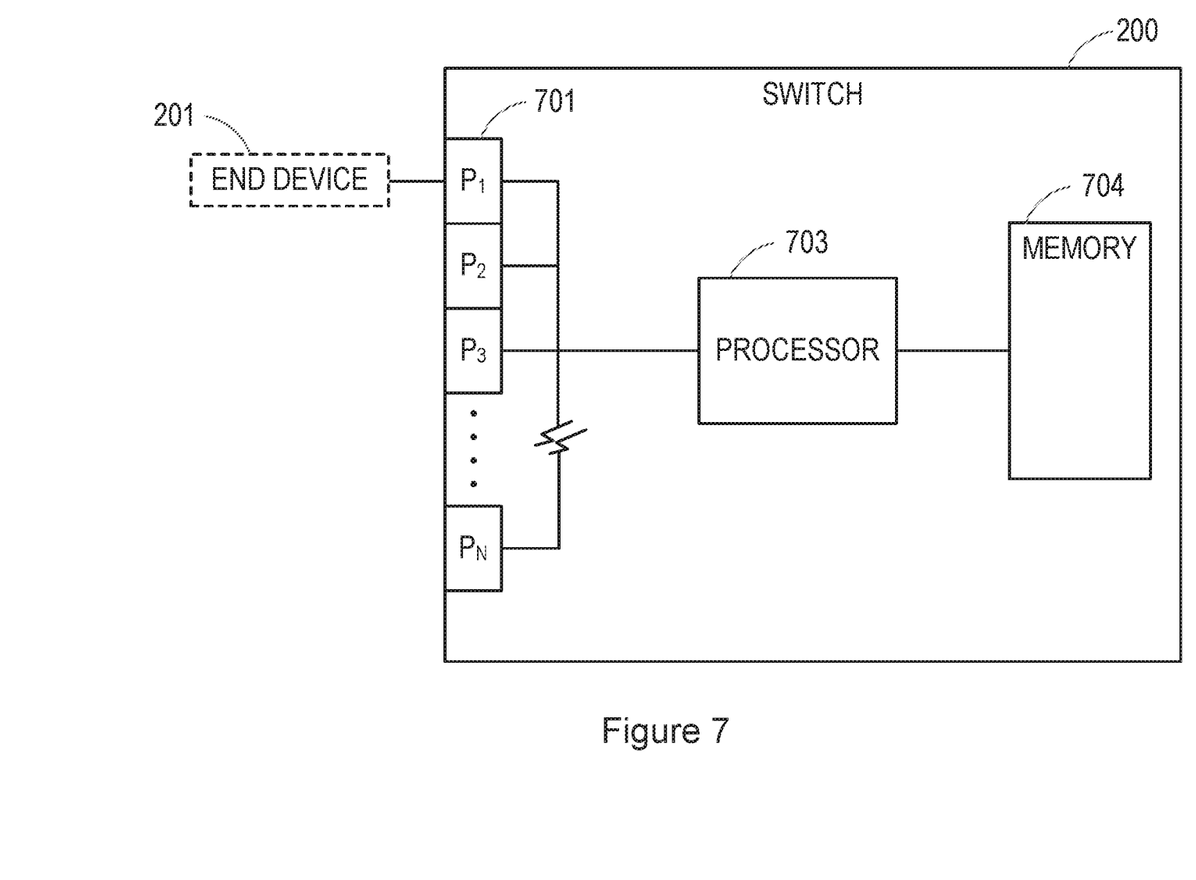
FIG. 7 is block diagram of an example of a switch.

FIG. 7 shows another example of a switch 200. The switch comprises a processor 707 and a memory 704 for storing instructions executable by the processor 703. The switch comprises a plurality of ports $P_1$ to $P_N$. The switch may also comprise other components, not shown, for enabling the switch to operate in an enterprise network.

In response to an end device 201 connecting to a port $P_x$ of the switch 200, the instructions stored in the memory 704 cause the processor 703 to detect that the end device 201 has connected to the switch 200, determine a device identity of the connected end device 201, use the determined device identity to obtain a configuration template profile associated with the connected end device 201, and configure the switch 200 using the obtained configuration template profile.

The device identity may be determined as described in the other examples herein. The configuration template profile may be obtained as described in the other examples described herein.

From the examples described above it can be seen that the solutions provide a complete end-to-end generic TIP solution for an end device to come onboard. Once the end device is connected to the switch, the switch determines its identity, for example by going to a fingerprint engine such as a CPPM server with the device fingerprint that is captured, e.g. using a LLDP TLV packet. Once the CPPM receives this information, it queries an internal dictionary for the specific device and reverts back to the switch with the device-identity (Device_ID). Once the switch has the Device_ID and hence a link to the appropriate template profile information, the switch goes to the NMS, for example, where the configuration template profile is already stored, for example by having been added previously, e.g. manually, by an administration process, and fetches the profile. The NMS then pushes the template profile to the switch, for example to a relevant port on the switching device.

The automatic device detection and configuration described in the examples herein may detect a directly connected end device, e.g. access point, dynamically, and apply predefined configurations to ports on which the access point is detected. Port configuration profiles can be created, which are associated to a device type, whereby a device type can be enabled or disabled. Connected end devices are identified using, for example, LLDP. When the LLDP information on the port ages out or there is a link flap, the device template profile can be removed in such circumstances. By default, the device template profile feature may be disabled. When the device template profile support for a device type is enabled, if no other device template profile is mapped to the device type, the default configuration profile is associated with the device type.

In some examples described herein, an end device may be classified using device profiles according to the following hierarchical element, for example three hierarchical elements:

Category—this is the broadest classification of a device. It denotes the type of the device, for example, access point, VoIP phone, printer, computer, or smart device.

Family—Devices within a category are organized into families based on type of OS or type of vendor. For example, when the device category is computer, the family might be Windows™, Linux™, or Mac OS X™. When the device category is smart device, the family might be Apple™ or Android™.

Name—Devices within a family are further organized by more granular details, such as version. For example, when the device family is Windows™, the device name might be Windows 7 or Windows 2008 server.

According to another example, once the device type is detected through LLDP, the switch reverts back the details to CPPM. Once the CPPM has received this information, it queries the internal database/dictionary for the specific device and reverts back to the switch with the device-identity (ID) i.e. the template profile to be downloaded. Once the switch has the template profile information, the switch goes to the NMS where the template profile is already stored manually by the admin and fetches the profile. The NMS then pushes the template profile to the appropriate device. Thus, the complete process in this example can be summarized as: switch connecting to the device→device type is recognized using LLDP→switch sends this info to CPPM→CPPM queries its own database and reverts with template profile→Switch on getting template profile goes to the NMS→NMS pushes the profile configuration back to the switch and gets applied for that port and the device.

If another similar device type tries to connect to the device, the switch has the information of the device type and the device profile template to be applied to that particular device. In that case, the switch retains the device template profile and identity in a cache memory, which may be referred to as switch caching. Then, the switch checks its cache memory and applies the appropriate profile template on the device directly without going to CPPM and the NMS. This reduces the time for network admin significantly in order to try and bring up the device of the similar type because of the ZTP environment.

Multiple different template profiles are created for multiple devices such as AP profiles, RF management profiles, Wireless LAN profiles, Mesh profiles, QoS profiles, IDS profiles etc. and stored on the NMS. The switch on detecting the device identity directly applies the appropriate configuration in the form of templates being pushed from the NMS side. The profiles and templates also take care of the variables and any other error that it may contain and results in delta separately.

When a configured device type is connected on a port, the system automatically applies the corresponding configuration with the help of the switch and NMS.

The examples described herein avoid the need for manual provisioning when a new end device is connected, or needs to be onboarded, which saves time and resources. With less-involved provisioning, a provider can support a large customer base with a small staff size, leading to fewer labour demands. Likewise, fewer manual tasks mean that all hardware can be brought to production faster.

The examples also provide quality assurance, since such automation minimizes manual configuration errors, for example by avoiding typographical errors and incorrect driver installations, which can stall deployment by hours. However, with ZIP, the initial configuration, along with future updates and fixes, can happen through a single file. Such provisioning consistency is an asset for maintenance and troubleshooting.

The examples help simplify an end user "plug and play" experience, and helps reduce the need for IT intervention in the implementation of configuration and device onboarding, in turn helping to reduce operational expenditure, OPEX.

In some examples the end device settings can be pre-optimized to improve the experience through NMS, and can provide a simplified and more efficient deployment experience, and help with better tracking of devices. Configuration errors can also be reduced since there is no manual configuration needed. The ZIP approach, also enables any unskilled user to connect end devices without worrying about the per port device configuration, which has tended to cause difficulties for users in the past.

The examples allow an automated way of providing any configuration for any end device connection. In other words, a switch can detect the type of the connecting device in an automated way to decide which type of configuration needs to be applied, e.g. via a network management server.

In examples described herein, a "node" may be a computing device, such as a server, storage array, storage device, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. In examples described herein, nodes may communicate with one another via direct connections, via computer networks, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

As used herein, a "machine readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The functionalities described herein in relation to FIGS. 1, 3, 4 and 5 may be performed by a node (e.g., a switch), and may be implemented in the form of processing resource executable instructions stored on a machine readable storage medium, at least one engine(s) (as described herein), electronic circuitry, or any combination thereof.

An engine as described herein may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device at least partially implementing the processing circuitry may include the at least one machine-readable storage medium storing the instructions and the at least one processing resource to execute the instructions. In other examples, the engine(s) may be implemented by electronic circuitry.

Although certain examples have been illustrated and described herein, it will be greatly appreciated that a wide variety of alternate and/or equivalent examples or implementations calculated to achieve the same purposes may be substituted for the examples shown and described without departing from the scope of this disclosure. The examples may be implemented in a variety of ways. This application is intended to cover adaptions or variations of the examples discussed herein. Therefore, it is manifestly intended that examples be limited only by the claims and equivalents thereof.

We claim:

1. A method, executable by a switch to automatically onboard end devices connected thereto, the method comprising:
   detecting that an end device has connected to the switch;
   determining a device identity of the connected end device;
   using the determined device identity to obtain a configuration template profile associated with the connected end device; and
   configuring the switch using the obtained configuration template profile;
   wherein determining a device identity of the connected end device comprises: acquiring a device fingerprint relating to the connected end device, and determining if the device fingerprint already has a corresponding device identity stored locally at the switch;
   wherein in response to a determination that the device fingerprint does not already have a corresponding device identity stored locally at the switch, sending the acquired device fingerprint to a non-local fingerprint engine and receiving a device identity associated with the device fingerprint from the fingerprint engine; and
   wherein in response to a determination that the device fingerprint already has a corresponding device identity stored locally at the switch, retrieving the locally stored device identity associated with the device fingerprint from the local storage medium;
   using the determined device identity to obtain the configuration template profile;
   wherein if the device identity was retrieved from local storage, the device identity is used to obtain the configuration template profile from local storage; and
   wherein if the device identity was received from the fingerprint engine, the configuration template profile is obtained from a non-local network management server.

2. The method of claim 1, wherein the device fingerprint comprises a media access control, MAC, address of the connected end device.

3. The method of claim 1, wherein the device fingerprint is acquired using a link layer discovery protocol.

4. The method of claim 1, wherein the fingerprint engine forms part of a cloud network node, or a network policy manager server, or a policy management platform, or an authentication server.

5. The method of claim 1,
   wherein the locally stored configuration profile retrieved comprises a configuration profile that was obtained from the network management server during a previous connection of a similar end device.

6. The method of claim 1 wherein, if the determined device identity is not associated with a specific configuration template profile, using a default configuration template profile to configure the switch.

7. The method of claim 1, wherein the configuration template profile for an end device comprises a Power over Ethernet (PoE), profile.

8. The method of claim 1, wherein the detecting, determining, using and configuring are performed using zero touch provisioning, ZTP.

9. A network switching device comprising a processor and a memory, the memory comprising instructions executable by the processor, to cause the network switching device to automatically:
   detect that an end device has connected to the switch;
   determine a device identity of the connected end device;
   use the determined device identity to obtain a configuration template profile associated with the connected end device; and
   configure the switch using the obtained configuration template profile;
   wherein determining a device identity of the connected end device comprises: acquiring a device fingerprint relating to the connected end device, and determining if the device fingerprint already has a corresponding device identity stored locally at the switch;
   wherein in response to a determination that the device fingerprint does not already have a corresponding device identity stored locally at the switch, sending the acquired device fingerprint to a non-local fingerprint engine and receiving a device identity associated with the device fingerprint from the fingerprint engine; and
   wherein in response to a determination that the device fingerprint already has a corresponding device identity stored locally at the switch, retrieving the locally stored device identity associated with the device fingerprint from the local storage medium;
   using the determined device identity to obtain the configuration template profile;
   wherein if the device identity was retrieved from local storage, the device identity is used to obtain the configuration template profile from local storage; and
   wherein if the device identity was received from the fingerprint engine, the configuration template profile is obtained from a non-local network management server.

10. The network switching device of claim 9, wherein the locally stored configuration profile retrieved comprises a configuration profile that was obtained from the network management server during a previous connection of a similar end device.

11. The network switching device of claim 9, wherein if the determined device identity is not associated with a specific configuration template profile, a default configuration template profile is used to configure the switch.

12. The network switching device of claim 9, wherein the configuration template profile for an end device comprises a Power over Ethernet (PoE) profile.

13. A non-transitory machine-readable storage medium comprising instructions that, when executed by a processor, cause the processor to:
   detect that an end device has connected to the network switching device;
   determine a device identity of the connected end device;
   use the determined device identity to obtain a configuration template profile associated with the connected end device; and
   configure the network switching device using the obtained configuration template profile;
   wherein determining a device identity of the connected end device comprises: acquiring a device fingerprint relating to the connected end device, and determining if the device fingerprint already has a corresponding device identity stored locally at the switch;
   wherein in response to a determination that the device fingerprint does not already have a corresponding device identity stored locally at the switch, sending the acquired device fingerprint to a non-local fingerprint engine and receiving a device identity associated with the device fingerprint from the fingerprint engine; and
   wherein in response to a determination that the device fingerprint already has a corresponding device identity stored locally at the switch, retrieving the locally stored device identity associated with the device fingerprint from the local storage medium;

using the determined device identity to obtain the configuration template profile;

wherein if the device identity was retrieved from local storage, the device identity is used to obtain the configuration template profile from local storage; and wherein if the device identity was received from the fingerprint engine, the configuration template profile is obtained from a non-local network management server.

14. The non-transitory machine-readable storage medium of claim 13, wherein the locally stored configuration profile retrieved comprises a configuration profile that was obtained from the network management server during a previous connection of a similar end device.

15. The non-transitory machine-readable storage medium of claim 13, wherein if the determined device identity is not associated with a specific configuration template profile, a default configuration template profile is used to configure the switch.

16. The non-transitory machine-readable storage medium of claim 13, wherein the configuration template profile for an end device comprises a Power over Ethernet (PoE) profile.

* * * * *